(12) United States Patent
Hussain et al.

(10) Patent No.: US 7,693,653 B2
(45) Date of Patent: Apr. 6, 2010

(54) VEHICLE ROUTING AND PATH PLANNING

(75) Inventors: Talib S. Hussain, Jamaica Plain, MA (US); Richard F. Estrada, Newton, MA (US); Richard B. Lazarus, Winchester, MA (US); Stephen D. Milligan, Stow, MA (US); Gordon Vidaver, Watertown, MA (US)

(73) Assignee: BBN Technologies Corp, Cambridge, MA (US)

( * ) Notice: Subject to any disclaimer, the term of this patent is extended or adjusted under 35 U.S.C. 154(b) by 42 days.

(21) Appl. No.: 12/206,296

(22) Filed: Sep. 8, 2008

(65) Prior Publication Data

US 2009/0125225 A1    May 14, 2009

Related U.S. Application Data

(62) Division of application No. 10/877,814, filed on Jun. 24, 2004, now abandoned.

(60) Provisional application No. 60/555,778, filed on Mar. 24, 2004.

(51) Int. Cl.
  *G01C 21/30* (2006.01)
(52) U.S. Cl. .................. 701/200; 701/208; 701/209; 340/995.14
(58) Field of Classification Search ......... 701/200–213, 701/23, 117; 340/900–995.14; 342/357.01–357.17
  See application file for complete search history.

(56) References Cited

U.S. PATENT DOCUMENTS 5,890,088 A * 3/1999 Nimura et al. .............. 701/211
5,961,571 A * 10/1999 Gorr et al. .................. 701/207
7,184,886 B1  2/2007 Krull et al.
7,239,962 B2  7/2007 Plutowski
7,363,126 B1  4/2008 Zhong et al.

OTHER PUBLICATIONS

Garg et al. Optimization Techniques Applied to Multiple Manipulators for Path Planning and Torque Minimization. pp. 1-30.

Hussain et al. Evolution-based Deliberative Planning for Cooperating Unmanned Ground Vehicles in a Dynamic Environment.

(Continued)

*Primary Examiner*—Richard M. Camby
(74) *Attorney, Agent, or Firm*—Ropes & Gray LLP

(57) ABSTRACT

A method of determining a path having an ordered set of waypoints to be visited by a mobile agent to accomplish a mission includes: producing candidate paths using a multi-objective optimization algorithm, subject to a path production heuristic; selecting a path from the candidate paths, subject to a path selection heuristic; instructing the mobile agent to move according to the selected path; modifying a maintained subset of the candidate paths to produce a new candidate path using the algorithm and subject to the path production heuristic; designating either the currently-selected path or the new candidate path as the newly-selected path, subject to the path selection heuristic; and instructing the mobile agent to move according to the newly-selected path. The method may further include iterating production of new candidate paths, either randomly or based on modifications of previous candidate paths, to continually update an operation plan for the mobile agent.

37 Claims, 12 Drawing Sheets

OTHER PUBLICATIONS

Hocaoglu et al. Planning Multiple Paths with Evolutionary Speciation. IEEE Transactions of Evolutionary Computation. 5:3, 169-91 (2001).

Brumitt et al. Dynamic Mission Planning for Multiple Mobile Robots. pp. 220-234.

Gray, Sarah. What is Path Planning (Aug. 17, 2002) Retrieved from http://www.autonomoussolutions.com/articles.

Baker et al. A genetic algorithm for the vehicle routing problem. Computers & Operations Research. 30, 787-800 (2003).

Ashiru et al. Characteristics of a genetic based approach to path planning for mobile robots. Journal of Network and Computer Applications. 19, 194-69 (1996).

Gerkey et al. Sold!: Auction Methods for Multirobot Coordination. IEEE Transactions on Robotics and Automation. 18:5, 758-68 (2002).

Painton et al. Genetic Algorithms in Optimization of System Reliability. IEEE Transactions on Reliability. 44:2, 172-178 (1995).

Chen, M. et al. A Genetic Approach to Motion Planning of Redundant Mobile Manipulator Systems Considering Safety and Configuration. J. of Robotic Systems. 14:7, 529-44 (1997).

Coello, Carlos A. A Comprehensive Survey of Evolutionary-Based Multiobjective Optimization Techniques.

Sugihara, K. et al. Genetic Algorithms for Adaptive Motion Planning of an Autonomous Mobile Robot. IEEE Int'l Symp. on Computational Intelligence in Robotics and Automation (1997).

Baltes, J. et al. Adaptive Path Planner for Highly Dynamic Environments. University of Auckland, New Zealand.

* cited by examiner

VEHICLE ROUTING AND PATH PLANNING

CROSS-REFERENCE TO RELATED APPLICATIONS

This application is a divisional of U.S. patent application Ser. No. 10/877,814, filed on Jun. 24, 2004, now abandoned which claims priority to and benefit of, U.S. Provisional Patent Application No. 60/555,778, filed on 24 Mar. 2004, the entireties of each of which are incorporated by reference.

BACKGROUND

Technologies for the control of unmanned ground vehicles (UGVs) attempting to perform local path navigation while traversing unknown, off-road terrains permit simple longer-range path planning, such as navigation between human-specified waypoints. However, these technologies have yet to develop automated plan generation strategies toward achieving higher-level mission goals (e.g., reconnaissance, surveillance, and target acquisition) in light of changing environmental conditions, evolving mission requirements, and a desire or need to coordinate movement of multiple vehicles.

Approaches that have been used to address path planning and routing have included traditional artificial intelligence (AI) algorithms. For example, classical planning, hierarchical-task-network planning, and case-based planning use symbolic planning based on logic and reasoning. However, the problem of interest is essentially numeric, and hence less suited for reasoning about goals and sub-goals. Although AI planning techniques may be applied to a higher-level strategic planning problem—i.e., how to decide what the mission goals are—their utility is diminished in the context of tactical planning problems wherein the mission goals are already known.

Other approaches, such as coordinated robot planning, focus on collision avoidance as a primary criterion for path planning. In many contexts, there is so much space compared to the number of vehicles that the probability of collision is slim. Yet other multi-robot planning algorithms are primarily concerned with formations and moving of vehicles in unison, and not on balanced workload distribution. Investigations into coordinating robot behavior by dividing the workload have generally been reactive (local) rather than deliberative (global), losing the benefits of planning ahead for multiple goals. Furthermore, when assigning goals, path planning is treated as a separate problem, thus substantially ignoring an enemy or obstacle between a vehicle/robot and a nearby goal point.

One investigation into controlling UGVs is the Distributed Architecture for Mobile Navigation (DAMN), carried out at Carnegie Mellon University. DAMN includes behaviors such as "road following," "seeking the next navigation goal," "obstacle avoidance," and "avoid hazards." Each behavior provides a vote on the next direction to take. A command arbiter decides upon the best direction, which is then acted upon by the UGV. DAMN also includes a global navigator to determine a full path to a goal position. However, DAMN uses a D* (dynamic A*) search algorithm. This approach, however, does not accommodate as many criteria and as much information, at the deliberative planning level, that are generally at play, when determining mission assignments and paths that are not fooled by local gradients.

SUMMARY OF THE INVENTION

There is a need for improved operation planning systems and methods for one or more mobile agents that incorporate any combination of deliberative and reactive planning strategies. The systems and methods described herein are generally directed at, among other things, embodying local as well as global criteria in operation planning (including path planning and routing), yielding global solutions more efficiently and reliably, handling a myriad of constraints typically present in various mobile agent operation planning contexts of interest, placing a fair emphasis on balancing workload distribution among members of a fleet of mobile agents, often dynamically, and having sufficient flexibility to incorporate new criteria into, remove existing criteria from, or reorder priorities in, an operation plan design process. In one embodiment, the systems and methods disclosed herein employ a domain-specific multi-objective optimization algorithm, such as, without limitation, a context-influenced genetic algorithm, to dynamically determine paths for one or more mobile agents to accomplish one or more mission goals; a path may include instructions on traversing at least a portion thereof.

According to one aspect, the invention includes a method of determining a path having an ordered set of waypoints to be visited by a mobile agent to accomplish a mission. The method includes (a) producing candidate paths using a multi-objective optimization algorithm, subject to a path production heuristic; (b) selecting a path from the candidate paths, subject to a path selection heuristic; (c) instructing the mobile agent to move according to the selected path; (d) modifying a maintained subset of the candidate paths to produce a new candidate path using the algorithm and subject to the path production heuristic; (e) designating either the currently-selected path or the new candidate path as the newly-selected path, subject to the path selection heuristic; and (f) instructing the mobile agent to move according to the newly-selected path.

In one particular embodiment, the method includes, after step (f), repeating steps (d)-(f) at least once prior to the mobile agent accomplishing the mission. In another embodiment, the multi-objective optimization algorithm includes an evolutionary algorithm, such as, for example and without limitation, a genetic algorithm.

According to one practice, modifying the maintained subset of candidate paths is performed continually (e.g., in the background), even after instruction has been issued, as in step (c), to the mobile agent to commence movement according to the selected path. This, at least in part, is to produce, with time, an improved path to be selected for the mobile agent, and to dynamically respond to stimuli in the environment or to time-sensitive mission requirements.

According to one practice, the subset of candidate paths to be maintained satisfies a diversity criterion, thereby increasing a likelihood of approaching a globally optimal, and not merely a locally optimal, solution. According to one embodiment, the path selection heuristic and the path production heuristic are mutually independent; according to one particular practice, this independence hold laterally across a given iteration of the steps (d)-(f), or longitudinally across different iterations. In an illustrative embodiment, production of one candidate path is independent of production of another candidate path, whether in the same iteration/generation or across different iterations/generations. Additionally, one or more of the path production heuristic and the path selection heuristic may be time dependent. The heuristics may be influenced by environmental characteristics and/or evolving mission requirements. According to various embodiments, modifying the candidate paths includes a combination of adding, deleting, and reordering waypoints along a path belonging to the candidate paths.

The systems and methods described herein are suitable for operation planning applications involving a fleet of mobile agents. According to one aspect, the invention includes a method of determining paths for a fleet of mobile agents to accomplish missions, every path having an ordered set of waypoints to be visited by a corresponding mobile agent. The method includes: (a) producing candidate path sets using a multi-objective optimization algorithm, subject to a path production heuristic; (b) selecting a path set from the candidate path sets, wherein every mobile agent has an associated path belonging to the selected path set, subject to a path selection heuristic; (c) instructing a first subset of the mobile agents to move according to paths respectively associated with the first subset; (d) modifying a maintained subset of the candidate path sets to produce a new candidate path set using the algorithm, subject to the path production heuristic; (e) designating either the selected path set or the new candidate path set as the newly-selected path set, subject to the path selection heuristic; and (f) instructing a second subset of the mobile agents to move according to paths belonging to the newly-selected path set, respectively associated with the second subset.

In one particular practice according to this embodiment, the method includes, after step (f), repeating steps (d)-(f) at least once prior to the mobile agents accomplishing the missions. In one embodiment, the multi-objective optimization algorithm includes an evolutionary algorithm, such as, for example, a genetic algorithm. Methods of evolutionary algorithms in general, and genetic algorithms in particular, are described in "Multi-Objective Optimization Using Evolutionary Algorithms," by Kalyanmoy Deb, John Wiley & Sons, 2001, ISBN: 047187339X.

According to various embodiments, modifying the candidate path sets includes a combination of adding, deleting, and reordering waypoints along a path belonging to the candidate paths. Additionally, the modifying may include trading of one or more waypoints between two or more of the mobile agents, as needed or as preferred.

According to one practice, the path selection heuristic and the path production heuristic are mutually independent. In one particular embodiment, the path selection heuristic at one iteration is independent of the path selection heuristic at another iteration. In another embodiment, the same is true for the path production heuristic. One or both of the path selection heuristic and the path production heuristic may be time dependent. In yet another embodiment, production of candidate path sets is performed continually, possibly in the background; this is at least partially to dynamically update path sets so an improved path set is selected for the fleet of mobile agents. The dynamic updating may at least in part be influenced by environmental influences or evolving mission requirements.

Further features and advantages of the invention will be apparent from the following description of illustrative embodiments, and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

Figure 1:
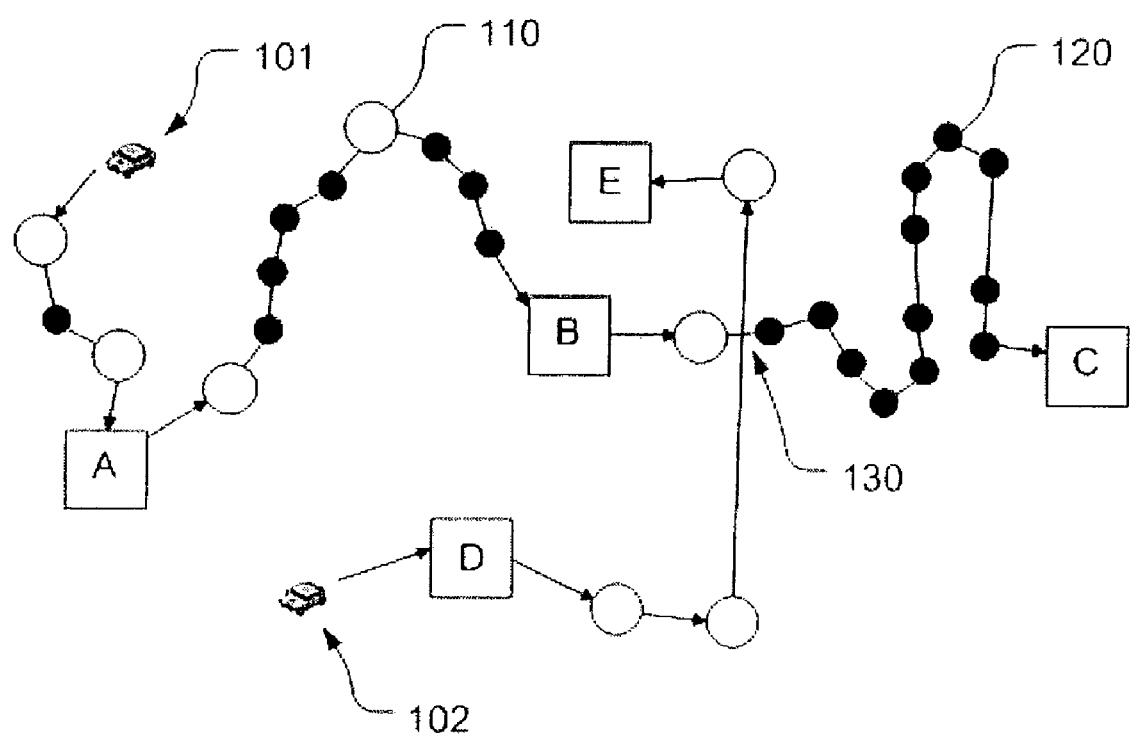
FIG. 1 depicts an inferred path set having two paths to be traversed by two respective mobile agents from their respective reference locations.

To provide an overall understanding, certain illustrative practices and embodiments will now be described, including a system and method for determining a path having an ordered set of waypoints to be visited by a mobile agent to accomplish a mission. In a typical embodiment, the mobile agent includes a vehicle, which may be manned or unmanned. For example, and without limitation, the vehicle may include a sea, ground, air, or space vehicle, or an amphibious vehicle capable of movement in, and across a boundary of, two or more terrain types (e.g., a sea-ground amphibious vehicle, an amphibious craft capable of traveling in and beyond a planet's atmosphere, etc.). The sea vehicle may be capable of movement on an aquatic surface region, subsurface region, or both. Analogously, a ground vehicle may be capable of movement underground, on a ground surface, or both.

In an alternative embodiment, the mobile agent includes a human (e.g., a soldier, a rescue worker, or another mobile personnel unit), a robot or robotic component (e.g., a robotic arm), a computer-generated agent, an animal (e.g., monkey, dog, dolphin, bird, or other trained or trainable animal), or any other agent trained, trainable, configured, or configurable to receive and follow movement instruction. In a typical embodiment, the systems and methods described herein determine a path for a fleet of mobile agents—wherein the fleet may include a combination of the agent types described above or their equivalents—to accomplish a set of missions.

The systems and methods disclosed herein are described primarily in the context of unmanned ground vehicles (UGVs). However, it is understood that these systems and methods may be adapted, modified, and applied in other applications, and that such other additions, modifications, and uses will not depart from the scope hereof.

In one aspect, the systems and methods described herein are directed at solving a combination of routing and path planning problems. The systems and methods disclosed herein solve the two problems jointly and adapt the solution dynamically to a changing environment and a time-dependent mission goal landscape.

In response to an environment and a set of dynamically-changing mission requirements, it is desirable for the planning system to perform replanning of both reactive (local) and deliberative (global) varieties. Examples of reactive replanning are when a UGV avoids an obstacle or turns to run away from an enemy. An example of deliberative replanning is when a UGV discovers a previously-unknown enemy and modifies its path, typically its entire remaining path, to circumvent the enemy and remain hidden en route to its next mission goal. Another, more complex, example of deliberative replanning is when a first UGV, upon discovering an enemy and determining that reaching a next mission goal in time is difficult, entails unacceptable risk, or is no longer feasible, trades goals with a second UGV having a substantially unobstructed path to the first UGV's next mission goal.

In one aspect, the systems and methods described herein treat the operation planning problem as a multi-objective optimization problem to determine an operation plan for multiple UGVs and achieve multiple mission goals while satisfying multiple criteria, such as tactical criteria, as best as possible based on known environmental and tactical situation knowledge available.

An operation plan includes a set of paths, one path for each UGV, wherein each path includes a sequence of navigation waypoints. In a typical embodiment, the path also includes instructions (generally real-time instructions) for local movement between a pair of the waypoints.

A mission goal includes a geographic location or area to be visited by the UGV; optionally, the mission goal also has an associated temporal constraint, generally expressed as a time window of arrival at, and/or departure from, the area. The UGV may be assigned zero or more mission goals.

A tactical criterion is defined, at least in part, as a property of the operation plan that is desirable for a particular state of the environment, such as, without limitation, enemy avoidance, hazard avoidance, stealth, or rapid achievement of mission goals.

As defined herein, a path includes an ordered set of waypoints to be visited by a mobile agent. FIG. 1 illustrates geographic locations of the waypoints and the inferred directed path along the respective paths for each of the UGVs 101 and 102, starting at the UGV's respective current location. Up to three types of waypoints are used by the systems and methods described herein, though alternative types may be defined for various contexts. Waypoints A-C are mission points belonging to the path to be traversed by the UGV 101 and the waypoints D-E are mission points belonging to the path to be traversed by the UGV 102. The waypoint 110 (and other hollow circles shown in the figure) denotes a route point, whereas the waypoint 120 (and other solid circles shown in the figure) denotes a travel point.

A mission point is a waypoint associated with a predetermined mission goal at a specific geographic location; the sequence of mission points along the path assigned to a UGV determines the order in which the UGV accomplishes its assigned missions. A sequence of route points determines the general route followed by the vehicle between two mission points. A route point may be manipulated—i.e., traded between UGVs, removed from the path, added to the path, or reordered—by the systems and methods described herein, as part of replanning and continual path and/or operation plan improvement. A sequence of travel points is used to specify a detailed route followed between two route points. Note that UGV paths may intersect, as shown by 130 in FIG. 1.

Figure 2A:
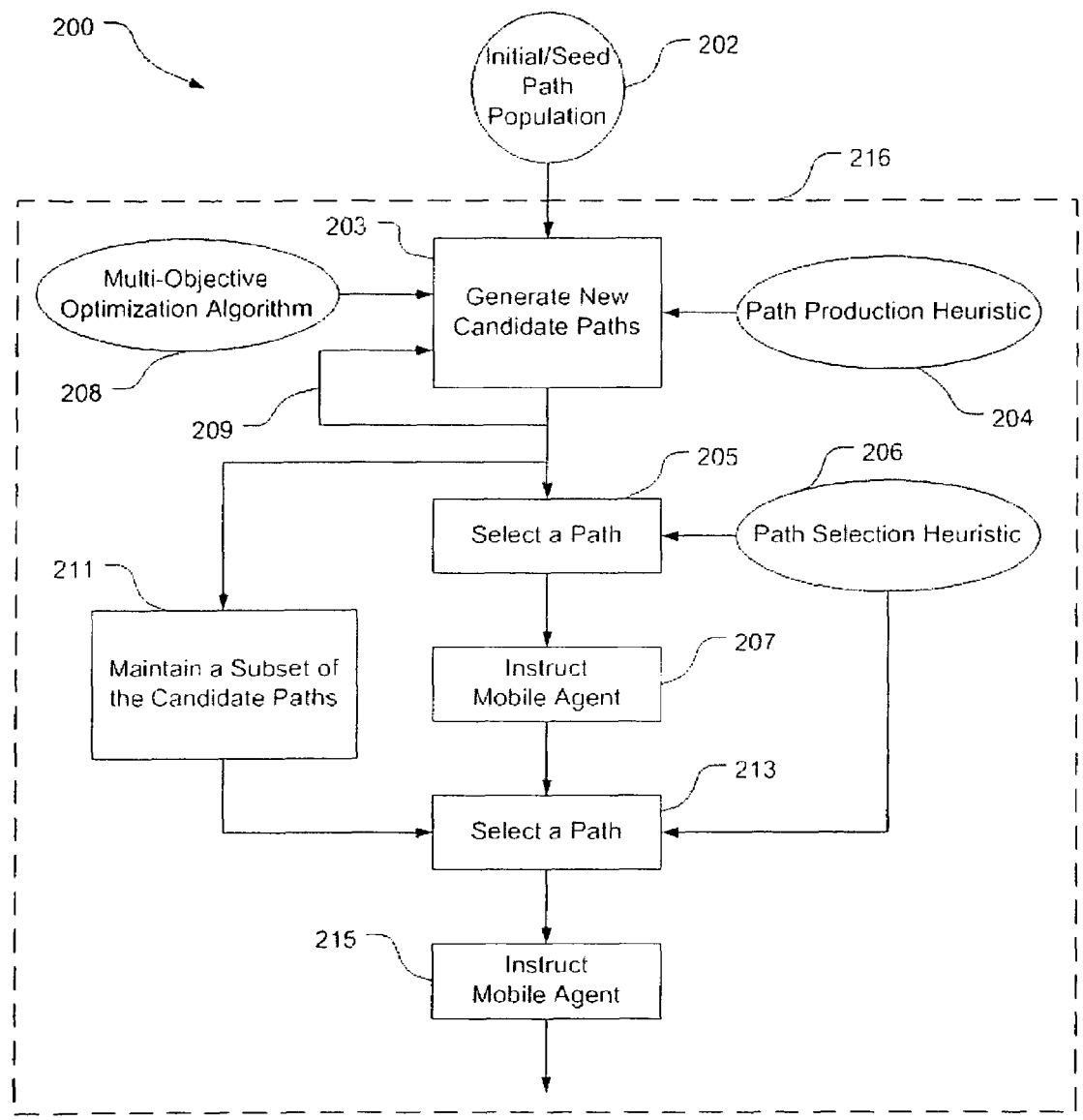
FIG. 2(a) depicts a representative block diagram of an illustrative embodiment of a method of determining a path having an ordered set of waypoints to be visited by a mobile agent to accomplish a mission.

FIG. 2(a) depicts a block diagram representation 200 of an exemplary method of determining a path having an ordered set of waypoints to be visited by a mobile agent to accomplish a mission. Based on an optional initial/seed population 202 of paths, the method generates 203 a set of candidate paths based at least partially on a path production heuristic 204 and a multi-objective optimization algorithm 208. According to one practice, the initial/seed population 202 is randomly produced. In a typical embodiment, the multi-objective optimization algorithm 208 includes an evolutionary algorithm, such as, for example and without limitation, a genetic algorithm.

From the candidate paths, one path is selected 205 for the mobile agent, the selection being at least partially based on a path selection heuristic 206. In this embodiment, the method further includes instructing 207 the mobile agent to move according to the selected path.

Optionally, the method 200 includes continually and/or iteratively modifying 209 the candidate paths to produce new candidate paths 203, again, at least partially according to the path production heuristic 204 and the multi-objective optimization algorithm 208. In one embodiment, the modification may include a random modification of existing candidate paths to produce new candidate paths. In an alternative embodiment, a modifier is employed that advocates a path modification based at least partially on a tactical criterion. In the modification executed by the systems and methods described herein, the entire remaining portion of a first mobile agent's path may be recomputed, and this may include addition, deletion, reordering, or trading (with a second mobile agent, if one exists) of waypoints along the first mobile agent's previously-assigned path. One or more of these modifications (addition, deletion, reordering, and trading of waypoints) may be independent of a previously chosen or currently in-effect path.

According to one embodiment, the method compares a maintained subset 211 of the candidate paths and the previously-selected path 205, to select a new path 213 subject to the path selection heuristic 206, and instructs 215 the mobile agent to move according to the newly-selected path. According to one practice, determination of what subset of the candidate paths to maintain from one iteration to another is at least partially based on a diversity criterion; a diverse path population ensures that the iteration evolves toward a global solution and does not gravitate to a mere local optimum.

Selection of the new path may be triggered by any of a number of stimuli. For example, appearance of an enemy proximal to the previously-selected path 205 may trigger selection of the new path so the mobile agent being affected may circumvent the enemy. In an exemplary embodiment, the path production heuristic 204 and the path selection heuristic 206 are mutually independent of each other. Additionally, one or both of the path production heuristic 204 and the path selection heuristic 206 at a particular iteration may be independent of one or more respective counterparts at previous or future iterations. One or more of the path production heuristic 204 and the path selection heuristic 206 may be time-dependent; one example of where this is the case is when heuristics are altered due to changing environmental conditions or mission requirements. In yet another illustrative embodiment, production or selection of a particular candidate path is mutually independent of the production or selection of another candidate path, whether in the same iteration or a different iteration.

In one aspect, a domain-specific path selection heuristic 206 captures a rule-of-thumb for evaluating the relative worth of a given path (in particular, to enable comparisons with alternative paths). This heuristic generally reflects one or more planning constraints, and in particular, the relative importance or interactions between those constraints. Analogously to the path production heuristic, the path selection rule-of-thumb may capture "expert knowledge" applied by human planners. In an exemplary embodiment, a weighted sum of a set of heuristic computations is employed to form a single criterion for path selection.

Figure 2B:
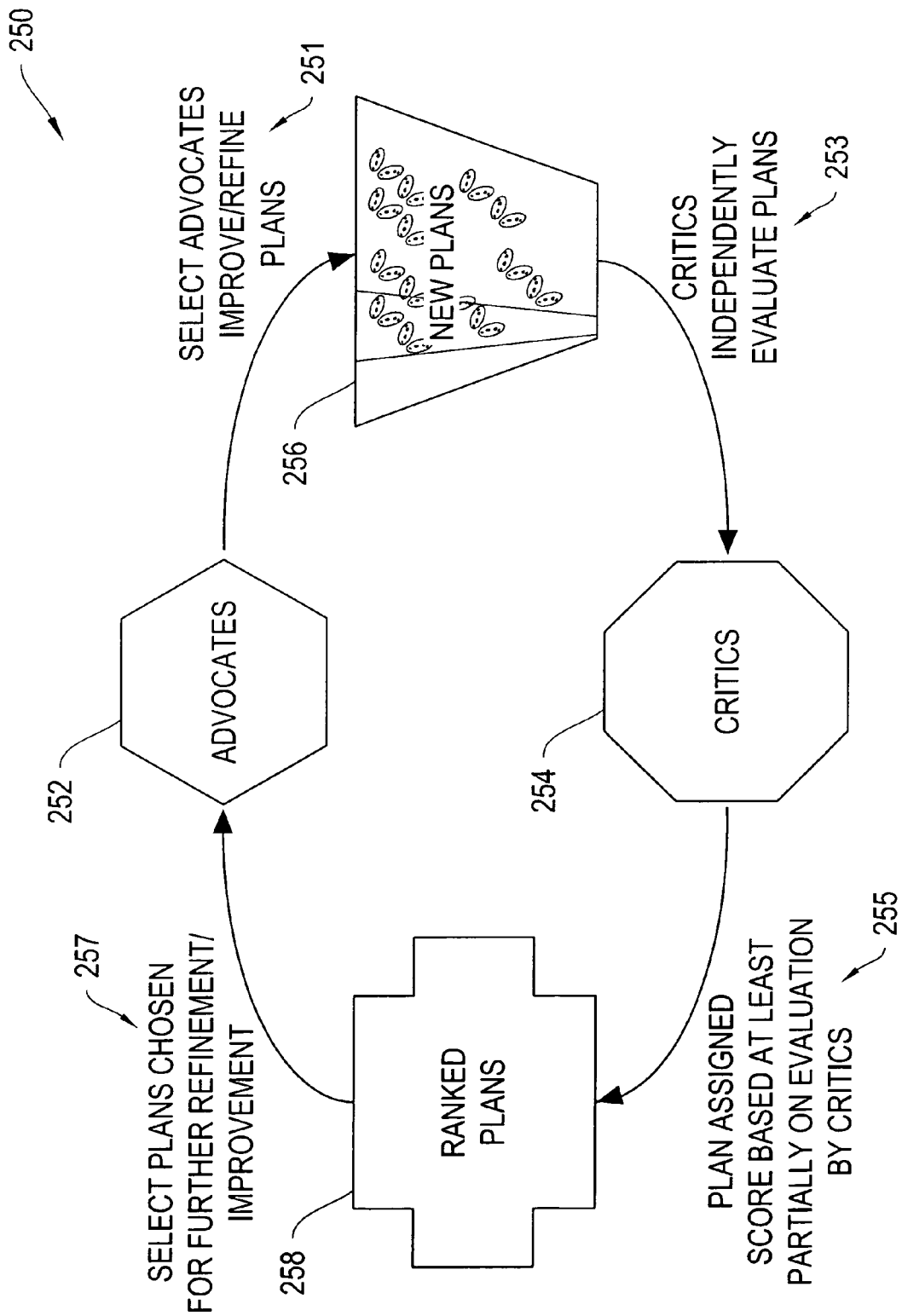
FIG. 2(b) depicts an embodiment of a continually-running operation planning algorithm that includes evolution and improvement.

In one embodiment, the path production heuristic 204 and the path selection heuristic 206 employed by the systems and methods described herein are generally referred to as Advocates and Critics for Tactical Behaviors (ACTB). As shown in FIG. 2(b)—which coarsely depicts an exemplary embodiment of the method 200 of FIG. 2(a) involving advocates and critics—the advocates 252 and the critics 254 interact in a cycle 250 that is exposed to, and influenced by, the "world" defined by the problem environment. Within the exemplary planning cycle 250 of an embodiment of the ACTB system and/or method, multiple advocates 252 are used to generate 251 a number of new plans 256 (or improve 251 existing plans) based at least partially on a set of seed/initial or existing plans. The new plans 256 are evaluated 253 by a number of critics 254. The results of the evaluations by the critics 254 are combined to produce a measure/score 255 of the quality of each plan, and by which the plans are ranked 258. A subset of the plans are then chosen 257 for further manipulation in a subsequent cycle 250. In one embodiment, the choice of plan depends on the path selection heuristic, whereas in another embodiment the choice of plan depends on the path production heuristic that rewards diversity in the candidate path population. According to one practice, the planning cycle 250 proceeds in a continual manner (possibly independently of other cycles), and interacts with the world in a continual manner. As better plans are evolved, they may influence the current plan being executed. As new discoveries are made or changes occur in the world, the planning process is informed so that the advocates 252 and the critics 254 may incorporate new information into their processing.

According to one aspect, an advantage of the continual, cyclic nature 250 of the ACTB system is two-fold. First, at each iteration, the set of new plans 256 improves overall, at least partially based on more recent knowledge. Second, at each iteration the critics 254 evaluate the plans based at least partially on the most recent knowledge available. Thus, a change to the tactical situation is detected and incorporated by the systems and methods described herein; subsequent modifications by the advocates 252 are rewarded based at least partially on the new situation.

Within the ACTB system 250, the advocates 252 and the critics 254 interact, albeit typically indirectly. According to one embodiment, every advocate is associated with a specific critic, but the relationship need not be tightly linked. This indicates that certain tactical behaviors are associated with certain tactical objectives. For example, in an exemplary embodiment, a road-following advocate tends to generate plans that better satisfy a duration critic.

Furthermore, in one embodiment, distinct advocates drive the planning system in distinct directions. For example, the road-following advocate may promote changes opposite to, or substantially distinct from, those promoted by an enemy avoidance advocate. While advocates are typically, though not always, employed and applied independently, this does not pose an issue, because the critics will resolve the best changes or combinations of changes over time.

Analogously, in one embodiment, distinct critics drive the system in distinct directions. For example, the duration critic may penalize plans that a surveillance critic rewards (e.g., a plan that sends UGVs to the tops of hills generally takes longer to execute than a plan that sends the UGVs over flat terrain). This competition is indicative of the variety of, at times even conflicting, tactical objectives desirable for a mission. The overall needs of the mission are taken into account, and the relative importance of each tactical objective is accommodated by the systems and methods described herein. Furthermore, the systems and methods disclosed herein employ, in one embodiment, a mechanism to combine the evaluations of the critics and resolve these issues; the design of this mechanism's functionality can generally be relevant to the overall performance of the ACTB system.

Three exemplary tactical advocates include mission-allocation advocate, avoid-untraversable advocate, and a road-following advocate. It is understood, however, that these three types are illustrative only and should not be considered limiting in any way. Other applications may have fewer or more advocate types, or, generally, may employ different advocate types.

The mission-allocation advocate exploits knowledge of the mission goals and their requirements to allocate mission goals to the UGVs. Typically, it operates in two modes, though other numbers and types of modes are conceivable, depending on the context. A first exemplary mode is selected if a mission goal remains outstanding, that is, it has not yet been assigned to any UGV within a given path genome. In this mode, and according to one embodiment, the mission-allocation advocate assigns the outstanding mission goal to a randomly-selected UGV by inserting a corresponding mission point into the path of the randomly-selected UGV, next to an existing route point or mission point closest to the outstanding mission point along the UGV's path. The order of the new mission point is determined by the existing information in the UGV's path.

A second exemplary mode is used when all missions have been assigned within a plan. According to the embodiment, the mission-allocation advocate randomly removes a sequence of one or more mission points—as well as all intermediate waypoints—from a path, and inserts that sequence before or after a randomly-chosen mission point in a randomly-chosen path in the plan. Thus, the missions may be inserted within the same UGV's path, thereby performing an effective re-ordering of the mission goals, or in the path of a different UGV, thereby performing a switch of mission goals from a first UGV to a second UGV. In this offspring path set, the new ordering of missions is randomly determined.

The avoid-untraversable advocate exploits terrain knowledge and a model of the movement capabilities of the UGVs to determine routes that do not have waypoints in untraversable terrain. For example, and without limitation, rivers and lakes may be untraversable for particular types of UGVs. The advocate identifies waypoints belonging to paths that lie in untraversable terrain, and then randomly selects one of these waypoints and moves it to a location on a traversable terrain. The new location is selected by searching on an arc towards the "traversable-predecessor" of the selected untraversable-waypoint. Any intervening waypoints are eliminated (since they necessarily would have been untraversable).

The road-following advocate exploits knowledge of the road network to determine a path segment between a pair of mission or route points making maximal use of roads. In one particular practice, roads are represented symbolically in a geospatial information development toolkit (e.g., Openmap™, BBN Technologies, Cambridge, Mass., USA). The road-following advocate randomly chooses two mission or route points on a randomly-chosen path. Using deterministic routines that query the road representation, the road-following advocate determines the closest road point to each selected waypoint, and obtains the shortest road path between those road points. This road path is represented as a sequence of travel points with route points at the each of its termini. The new sequence replaces the path between the original selection points.

There are contexts wherein using travel points is preferable to using route points. A segment of road may be highly curved or irregular, and as such it may require a large number of points to specify that segment in a piece-wise linear manner. If the travel points were included as possible points of selection by the other advocates, the process of selecting waypoints for adaptation would be overwhelmed by the large number of travel points. For example, an advocate may spend the majority of its time moving road points, and thus be highly ineffective at optimizing the route between mission goals.

At first glance, the road lookups of the road-following advocate seem to serve a purpose similar to the shortest-path lookups of existing planning techniques. However, the road lookup is limited to identifying only small road segments, and it has little or no impact upon the exploration of cross-country paths by other advocates. Rather than simply looking up a shortest path between two mission goals, which may be a tactically poor choice, an embodiment of the ACTB systems and methods described herein uses multiple tactical advocates to determine routes, and creates routes by making a number of small changes at random locations in the path. This enables the systems and methods described herein to explore a wide variety of routes between the two mission goals and adapt that route according to multiple tactical criteria. For example, some segments may result in a poor fitness according to one tactical critic; eventual removal or modification of those segments by tactical advocates may produce an improved path according to that critic.

A typical embodiment of the ACTB systems and methods described herein employs several types of tactical critics, all of which return path evaluations that are greater than or equal to 0, where lower numbers indicate better plans. It is understood, however, that these critic types, described below, as well as their typical output ranges, are illustrative only, and should not be construed as limiting in any way. Other applications may have fewer or more types of tactical critics, or, generally, may employ different critic types, possibly having alternative output value ranges.

Three exemplary types of critics include a traversability critic, a safety critic, and a stealth critic. The traversability critic exploits terrain knowledge and a model of the movement capabilities of the UGVs to identify portions of the path that wander into untraversable terrain. According to one practice, the traversability critic returns a penalty value proportional to distance traveled on untraversable terrain over all paths; it is worth noting that in the embodiment described, a path wandering into untraversable terrain is allowed, but is penalized accordingly.

The safety critic exploits knowledge of the known enemy locations and a model of enemy capabilities to evaluate whether a given plan places one or more UGVs in danger by placing them too close to a known enemy. According to one practice, the safety critic returns a penalty value proportional to the distance traveled within danger range of the enemy, over all candidate paths; it is worth noting that in the embodiment described, a path that places a corresponding UGV dangerously close to the enemy location is allowed, but is penalized accordingly.

The stealth critic exploits knowledge of the known enemy locations and line-of-sight computations to evaluate whether a given plan puts one or more UGVs at risk by placing them in the line of sight of a known enemy. According to one practice, the line of sight is computed using a geospatial information development toolkit and a model of the surveillance capabilities of the enemy. The advocate returns a penalty proportional to the distance traveled within surveillance range of the enemy; it is worth noting that in the embodiment described, a path that places a corresponding UGV within the enemy's surveillance range (e.g., direct line of sight, radar observation, sonar observation, etc.) is allowed, but is penalized accordingly.

Other critic types employed by one or more embodiments of the systems and methods described herein include a mission-success critic, a total-duration critic, and a max-duration critic, but as mentioned earlier, these exemplary critic types should not be construed as limiting the scope of the systems and methods described herein.

Figure 2C:
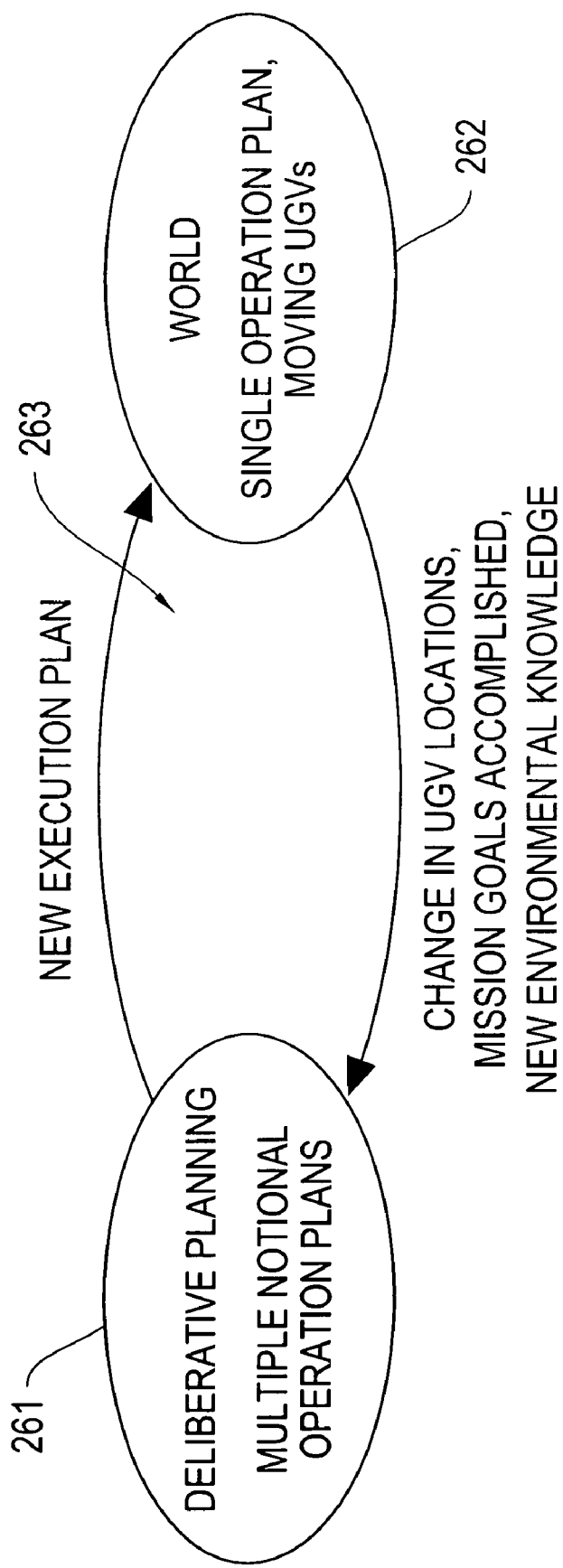
FIG. 2(c) depicts an illustrative continual interaction of the operation planning algorithm with the real-world environment.

In an illustrative embodiment, the ACTB systems and methods described herein facilitate performing continual operation planning within a dynamic environment, in which UGVs move, and wherein knowledge of the environment and tactical situation is time dependent. As illustrated in FIG. 2(c), in one aspect, the systems and methods described herein include a simulation-based system in which a deliberative planning process 261 explicitly interacts with a simulated world environment 262 in a continual cycle 263.

In one embodiment, the operation planning process employs an ACTB-influenced genetic algorithm to evolve multiple notional operation plans 261 for a predetermined number of generations. After a genetic run, the best plan is adopted as the prevailing execution plan, even if the plan was randomly generated at a particular iteration/run. The execution plan is communicated to the UGVs, which typically use a simple (non-reactive) execution model to visit their assigned waypoints. As execution proceeds, world events, such as the discovery of a new enemy location, may occur. These events trigger the operation planning process to evolve a new plan that incorporates the new tactical situation. Additionally, in an illustrative embodiment, the execution process may be suspended at regular intervals, and the deliberative process executed to explore further improvements to the prevailing operational plan. Path populations associated with the genetic algorithm are persistent across genetic runs.

From an implementation point of view, the ACTB-based systems and methods described herein may be programmed in Java and the simulation environment may use a geographic system to represent terrain information, provide basic functionality for making geographic inquiries, and provide a graphical interface. Alternatives to the programming language Java and the geographic system OpenMap™ may be employed without departing from the scope of the systems and methods described herein.

The systems and methods described herein typically employ an evolutionary algorithm to search for a good path for a mobile agent. Evolutionary algorithms are well-suited for complex, multi-objective optimization problems. In addition to their ability to search efficiently through large and complex spaces, evolutionary algorithms offer an additional advantage of being easily tailored to a particular domain for improved performance.

The systems and methods described herein take advantage of this through use of tactical advocates and tactical critics. The advocates include domain-specific mutations that modify a plan based on knowledge of good tactics. The critics compute various evaluation metrics corresponding to various criteria indicative of a good plan. The structure of the systems and methods disclosed herein makes it easy to add-advocates and critics and hence to incorporate additional domain knowledge; similarly, it is straightforward to remove an advocate or critic.

The ACTB genetic algorithm employed in an embodiment of the systems and methods described herein is based at least partially on the notion that potentially significant improvements to an overall plan are possible by applying a succession of small, goal-directed changes. According to one practice, these goal-directed changes are made using domain-specific genetic operators, termed tactical advocates, as already mentioned. In various illustrative embodiments, the improvements include global changes to one or more paths (in particular, to the remaining portions thereof) assigned to the UGVs.

In a typical embodiment, several traditional genetic mutation and crossover operators are used by ACTB to maintain sufficient diversity in the path population. In this embodiment, the tactical advocates continue to make novel plans rather than continue to rehash old ones. According to one practice, three mutation operators are used, each of which performs a mutation on a randomly-chosen chromosome within the genome. The number and nature of the mutation operators is understood to vary based on context, so the three illustrative types described herein should not be considered limiting in any way. As mentioned earlier, typically, only mission points and route points are manipulated (i.e., genetically mutated), not travel points.

In one embodiment, an insert-waypoint mutation operator randomly selects a waypoint on the chromosome and inserts a single waypoint before or after that point. The geographic location of the new waypoint is typically a small random distance in a random direction from a line connecting its neighbors.

A remove-section mutation operator randomly selects two waypoints in the chromosome and removes them and waypoints in between.

A nudge-waypoint mutation operator randomly selects a waypoint from the chromosome and modifies its geographic location slightly in a random direction.

In one exemplary embodiment of the systems and methods described herein, two genetic crossover operators are employed. It is understood that other contexts and applications may include genetic crossover operators distinct from, and fewer or larger in number than, the crossovers described herein.

The path-crossover operator is applied to a single genome parent, and performs variable-length one-point crossover between two randomly-chosen chromosomes within the genome.

The plan-crossover operator is applied to two genome parents, and performs variable-length one-point crossover between a randomly-chosen chromosome in one parent and a randomly-chosen chromosome in the other.

In an alternative embodiment, in addition to the tactical advocates, traditional domain-generic operators are also used to augment path search capabilities of the systems and methods described herein and/or to maintain path population diversity.

In one aspect, the ACTB genetic algorithm accommodates the multi-objective nature of the operation planning problem by using multiple, distinct evaluation components to determine fitness of candidate paths. Specifically, according to one practice, a tactical critic represents a domain-specific evaluation component that computes a single term of a fitness function. Each tactical critic typically evaluates how well a given operation plan satisfies a tactical criterion. For example, and without limitation, a critic for safety may evaluate a plan to determine how much danger the UGVs are placed in, due to traveling too close to a known enemy. In a typical embodiment, outputs of multiple critics are combined using a weighted sum to form a single fitness value. In a military context, for example, the weights associated with the critics reflect the tactical priorities of the operation.

The ACTB genetic algorithm accommodates a constraint-based nature of the operation planning problem by allowing ostensibly "illegal" individual paths into the population of candidate paths or path sets; an illegal path includes a path that violates at least one problem constraint. A path set includes, as the name implies, a set of paths; every mobile agent has an associated path belonging to the path set.

Additionally, the ACTB genetic algorithm-based systems and methods described herein employ fitness values to reflect the magnitude of a violation. Specifically, when a tactical critic evaluates a candidate operation plan (i.e., candidate path or path set) against a tactical criterion, it assigns a penalty if the plan violates that criterion. For example, in an illustrative embodiment, a critic assigned the task of determining whether a candidate path is traversable may still accept a path that crosses water (an untraversable terrain), but will assign a high penalty to the path. To enable a relative judgment amongst "illegal" plans, critics typically assign a penalty proportional to the degree of the violation. According to one exemplary practice, the distance to be "traveled" in water at least in part determines a magnitude or severity of the penalty imposed.

In an embodiment involving n UGVs, where $n \geq 1$ (more typically, $n \geq 2$), a genome is defined as a set of n chromosomes, wherein each chromosome defines the path for one of the UGVs as a variable-length sequence of geographic locations, or waypoints, to be visited by the UGV for a remainder of the operation plan. According to one practice, to evaluate a fitness of the genome, a successive pair of waypoints is assumed to be connected with a straight line. Therefore, according to the practice, each chromosome defines a piecewise linear directed path. The first waypoint in each path represents the next waypoint to be visited by the corresponding UGV. Typically, the first segment of the path is understood to be the straight line between the UGV's current location and the first waypoint in the path.

To enable effective genetic manipulations, an exemplary genetic representation includes three types of waypoints, each representing a different conceptual aspect of a path. It is understood, however, that not each of the three types of waypoints is required in all embodiments.

In the embodiment wherein the systems and methods described herein employ a genetic algorithm, a route point may be genetically manipulated, e.g., mutated.

A notable feature of travel points is that they generally are not available for selection as points of genetic manipulation by the systems and methods described herein. Rather, they are used to incorporate specific path segments between two consecutive mission points or route points. The relative benefits of these segments may then be evaluated through a genetic search. In an exemplary embodiment, route-points are used by a road-following advocate to represent complex road segments.

Figure 3:
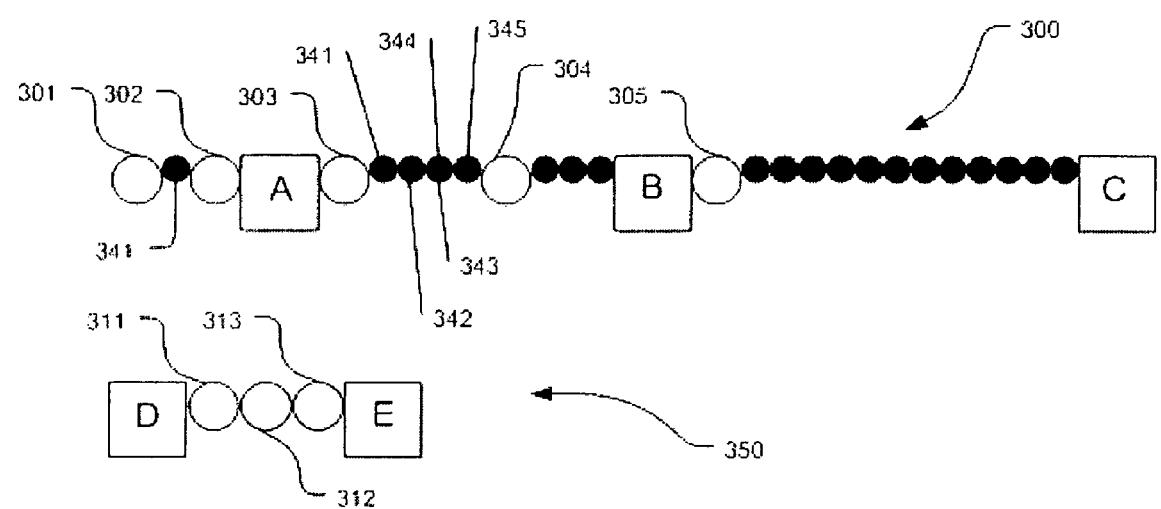
FIG. 3 depicts a genome of a path set having two chromosomes representative of two respective sequences of waypoints to be visited by two respective mobile agents.

FIG. 3 illustrates a sample genome having two chromosomes 300 and 350, respectively corresponding to a first UGV and a second UGV. Waypoints A-C are mission points belonging to the chromosome 300 and the waypoints D-E are mission points belonging to the chromosome 350. As in FIG. 1, each of the route points 301-305 and 311-313 is represented by a hollow circle, and each of the travel points 341-345 (and others not labeled in the figure) is represented as a solid circle.

The three types of waypoints are used to enable genetic manipulations targeted to different levels of planning. For example, manipulation of mission points and their order performs the task of scheduling missions, whereas manipulation of route points performs the task of route planning. In the context of a UGV platform, little to no distinction is required between the three types of waypoints, except that travel points typically may not be genetically mutated or otherwise manipulated.

The deliberative UGV planning problem shares some characteristics with a classic optimization problem, called the vehicle routing problem with time windows (VRPTW). In both problems, multiple vehicles are to move in such a way as to arrive at particular locations during predetermined time intervals. However, the UGV planning problem has nontrivial additional complications. One is that the paths between locations are generally not well-defined, and a task of the planning algorithm is to find a good path over a combination of roads and off-road terrain. A second complication is that the deliberative UGV planning entails a greater number of criteria to be considered for determining a good plan.

The operation planning systems and methods described herein are well-suited to solve the VRPTW. In particular, the problem involves predetermined time windows during which the mobile agents—UGVs in our illustrative example—are to arrive at, and/or depart from, a subset of the waypoints.

To solve the problem involving time window constraints, the systems and methods described herein employ, in one aspect, a greedy algorithm providing a unique interpretation of a path with respect to time, allowing the details of the path to be varied quite significantly. This is unlike a traditional "shortest-paths" lookup, wherein a set of fixed routes between key locations is stored; it also is unlike "dynamic" shortest-paths lookup, wherein the shortest routes between key locations are occasionally recomputed to accommodate new information.

The greedy algorithm provides a suitable framework for evaluating a path's duration as well as the success or failure of accomplishing the missions as part of the constrained operation planning problem. This problem may be defined more concretely as follows: given one or more mobile agents operating within a complex environment (e.g., urban environment, terrain with multiple features and terrain types, multiple known enemy locations, etc.), given one or more mission goals involving visiting specific locations within that environment, and given a set of general and mission-specific constraints, both hard and soft, imposed on prospective routes (e.g., the route must avoid enemies, the missions must be achieved as soon as possible, etc.), the constrained deliberative planning problem includes determining a route for each mobile agent such that over all mobile agents in the fleet, missions are successfully accomplished while satisfying substantially all hard constraints and soft constraints as best as possible.

According to one practice, the greedy algorithm employed by the systems and methods described herein assumes that a mobile agent will travel between the waypoints along its assigned path at a speed less than or equal to a maximum speed allowable or feasible for the terrain over which it is traveling. The algorithm also assumes that each of a subset of the waypoints represents an attempt to fulfill a respective mission, subject to a specified time window. An aspect of the greedy algorithm includes the notion that if a vehicle, traveling at its maximum speed, arrives at a mission point earlier than a prescribed time window, it may wait or move sufficiently slowly to ensure a timely arrival and/or departure. A mission is considered accomplished as long as a vehicle arrives to accomplish the mission at any point between the start and end time. This provides a mechanism for stepping through the path and evaluating the times at which the missions are accomplished.

In a larger context, the greedy algorithm may be employed within an evolutionary algorithm to solve the deliberative planning problem, when a route may be evaluated, typically dynamically, against multiple criteria other than simple travel time. That is to say, there is no a priori "best" route between a pair of mission locations; this variability can have an impact on the success of the deliberative planning effort. This is the case, for example, in planning for one or more UGVs whose routes are not only to be sufficiently quick, but must also enable the UGV to satisfy a variety of tactical constraints, such as avoiding enemies.

An issue when evaluating such a plan for deliberative planning includes a tradeoff between how to schedule the times of the missions versus the computation of the travel times when routes are not static in quality. Existing approaches are generally capable of performing one task or the other, but not both. If scheduling is performed, then a fixed routing lookup is assumed. If routing is performed, then the times on the missions are assumed to be secondary, and the focus is shifted to path planning.

According to one practice, the greedy algorithm interpretation of the execution of a path chromosome is as follows. Each mission goal is defined as a geographic location with an "earliest" time of arrival and a "latest" time of arrival; additionally or alternatively, an earliest time of departure or latest time of departure may be specified. The duration of travel between each successive pair of waypoints is computed—for example, by assuming that a mobile agent, such as a UGV, travels at its established maximum speed for each terrain type; alternatively, the UGV may be assumed to travel at an established average speed for each terrain type. Using the current time in the simulated world and the current location of the UGV as a starting point, the greedy algorithm steps through all waypoints on the chromosome in order, evaluates a duration of the path segments, and assesses mission success as it proceeds. In one aspect, the algorithm assumes that if a UGV arrives at a mission point too early, it is possible for that UGV to arrive on time (e.g., through the simple mechanism of driving more slowly or by waiting a prescribed amount at an appropriate venue).

In a greedy algorithm implementation of the systems and methods described herein, a notion of a "minimum wait time" for the UGV at each mission point is employed to model completion of the missions. It is assumed that the UGV will wait for the minimum possible amount of time at each of its assigned mission points to satisfy the time window constraint.

According to one practice, the greedy algorithm assumes a model of UGV movement speed over different terrain types, and evaluates a travel time between successive mission points based at least partially on distances and terrain traversed over the (piece-wise linear) path between them. Typically, each UGV is assumed to travel as fast as possible between mission points (though, in an alternative embodiment, an average speed is considered), and then wait as little as needed (if early)

to meet a prescribed time window requirement (i.e., the greedy choice). Thus, no special representation of time windows is required in the genome. The mission-success critic evaluates how well a given plan comes to accomplishing mission goals, and returns a penalty proportional to the number of failed goals and a corresponding degree of failure. The total-duration critic evaluates how long each UGV takes to execute its chromosome, and returns the sum of the durations of all chromosomes. The max-duration critic evaluates how long each UGV takes to execute its chromosome, and returns the longest duration over all chromosomes.

Figure 4:
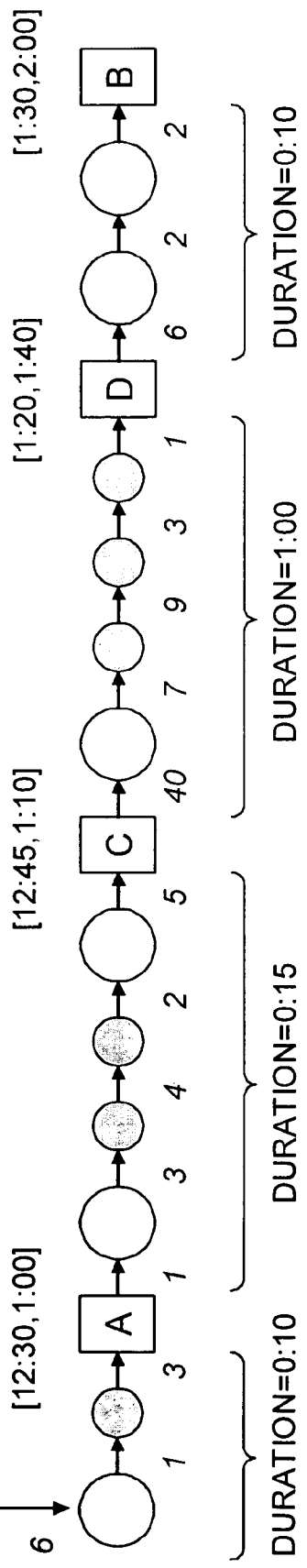
FIG. 4 depicts an illustrative greedy evaluation of the duration and mission success associated with a chromosomal representation of a path associated with a mobile agent.

FIG. 4 illustrates a sample evaluation of the duration and mission success of a path chromosome. Table 1 provides a summary snapshot of FIG. 4. For example, and without limitation, if a UGV traveling at its maximum allowable or feasible terrain speed over a set of route and travel points arrives at the first mission point on its assigned path too early, the systems and methods described herein assume that it would wait the minimum amount of time required to meet the "earliest" mission time window, and then move on; the arrival time window for the mission point A is 20 minutes for 'A', the interval [12:10 and 12:30]). At each subsequent mission point this same computation occurs. If the earliest possible arrival time lies within the prescribed time window, then the minimum wait time is 0 minutes (e.g., 'C'). If it is impossible for the UGV to arrive at a mission before or during the prescribed time window (i.e., it is late), then the amount of tardiness is recorded and the mission is flagged as having failed (e.g., 5 minutes late for 'D'). However, according to one practice, in a greedy fashion, the systems and methods described herein continue to evaluate the path and assume that, though late, the UGV went as quickly as possible to a subsequent mission point. For example, though late for mission D, the greedy choice is to depart as soon as possible (i.e., 1:45, indicated in bold in Table 1). Thus, being late for one mission (e.g., 'D') does not preclude success at a subsequent mission (e.g., 'B').

TABLE 1

| Mission A:<br>Earliest arrival: | Mission C:<br>Earliest arrival: | Mission D:<br>Earliest arrival: | Mission B:<br>Earliest arrival: |
|---|---|---|---|
| 12:00 + 0:10 =<br>12:10<br>→ Wait time =<br>0:20<br>(EARLY) | 12:30 + 0:15 =<br>12:45<br>→ Wait time =<br>0:00<br>(SUCCESS) | 12:45 + 1:00 =<br>1:45<br>→ Wait time =<br>−0:05<br>(FAILURE) | 1:45 + 0:10 =<br>1:55<br>→ Wait time =<br>0:00<br>(SUCCESS) |

The greedy algorithm employed by the systems and methods described herein provides, in a typical embodiment, a unique way of interpreting an inherently spatial property (namely, travel time along a route) within the context of an inherently temporal constraint (namely, to accomplish the missions during prescribed time windows).

In conjunction with an evolutionary algorithm, this provides a mechanism for exploring variations both in the routes ("space") and in the order of the missions ("time"), with little, if any, loss of capability. Over multiple generations and various sequences of waypoints, a plan may be evolved that correctly fulfills the mission time requirements while obeying the necessity of travel and multiple constraints upon that travel.

Figure 5:
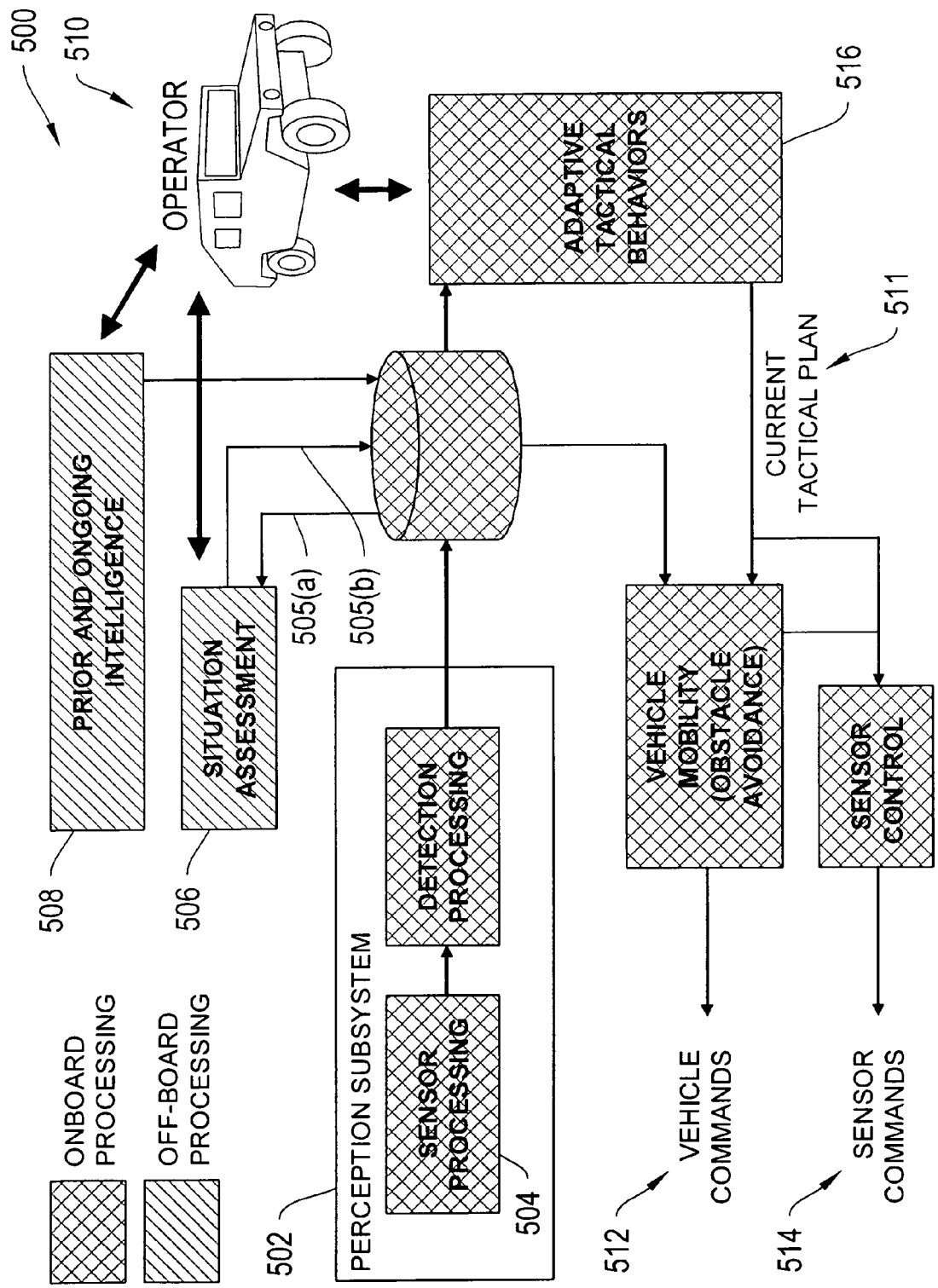
FIG. 5 depicts an embodiment of a tactical behavior planning algorithm in the context of an unmanned ground vehicle (UGV) navigation system.

FIG. 5 depicts a prototype application 500 of an embodiment of the ACTB systems and methods described herein, directed at the problem of deliberative planning of UGV routes. The figure illustrates an example of where the application fits into a larger on-vehicle processing system. The vehicle perception subsystem 502 processes and analyzes the sensor data 504 to produce an evolving description of a region that at least partially surrounds the vehicle. This description is reconciled 505(a)-505(b) with a priori topographic information and ongoing situation assessment 506, and intelligence 508 that is streamed to, collected by, or otherwise communicated to the vehicle. Similarly, and optionally, inputs and parameter settings are received by the vehicle from the operator 510. All this information—the scene description, the situation awareness, the intelligence, and the operator settings/inputs—forms the input to a typical embodiment of the ACTB systems and methods described herein, which continually monitor and review this data and formulate a plan 511, chosen from a pool of adaptively maintained tactical behaviors 516, for the vehicle's movement. In a sense, the adaptive tactical behaviors box 516 encompasses what is shown in FIG. 2(a). Specifically, the systems and methods described herein produce a sequence of vehicle commands 512 of waypoints expected to be followed by the vehicle. Optionally, commands sensor commands are issued 514 to the vehicle, instructing the vehicle to manipulate one or more sensors or data collection instruments. For example, and without limitation, the command 514 may include instructions to the vehicle to turn on an onboard camera and point it to a particular target. These waypoints are turned over to a navigation subsystem of the systems and methods described herein.

A property of an effective, automated replanning system and method for UGVs includes a capability for each UGV to cooperate with other UGVs in developing effective global solutions, but to accomplish this task without requiring the full knowledge of all known intelligence across all UGVs. A centralized solution, while it may be capable of developing highly-optimized solutions over all mission objectives, is impractical, because it requires an ability to maintain complete centralized knowledge of all environmental information, as well as update every UGV essentially at all times. A distributed system with full knowledge communicated to every UGV, while it may allow processing requirements to be distributed and enable each UGV to make globally-optimized decisions, is also impractical, because it requires essentially full communication and rapid update of newly-discovered knowledge.

Figure 6:
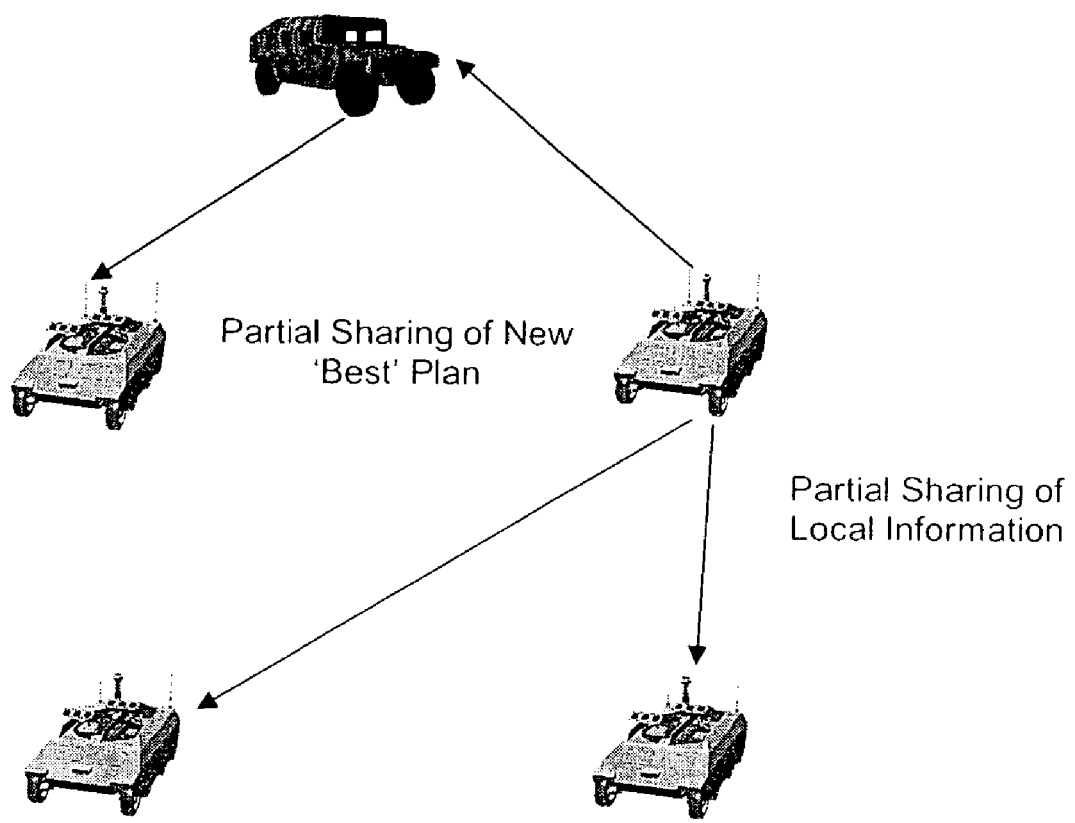
FIG. 6 depicts an embodiment of a communication network of multiple UGVs and a human operator over which collaborative planning occurs using distributed processing and partial information sharing.

In an exemplary realistic solution, a mobile agent, such as a vehicle, is capable of local processing and vehicles are assumed to be interconnected with respect to communications. In the exemplary solution, vehicles exchange sensor-derived information and may receive updated intelligence or directives from one or more human operators. FIG. 6 illustrates a possible communication network of multiple UGVs, possibly including a human operator, over which collaborative planning may occur. The exemplary system and method depicted by FIG. 6 illustrates that the deliberative planning may occur with sharing of partial information, not necessarily complete information, among the vehicles.

An aspect of the systems and methods described herein includes effectively planning locally while achieving path solutions that are optimized to some degree at a global level; as mentioned earlier, the entirety of the remainder of a path for a mobile agent may change as a result of the continual updating of the population of candidate paths, which may occur in part from an unexpected local stimulus, such as an unpredicted appearance of an enemy.

For an ACTB system and/or method, the continual replanning nature of the approach provides valuable benefits. Each UGV may execute its own directed evolutionary system, and independently evolve new candidates for the selected team plan based upon knowledge available to that UGV. Each UGV may periodically transmit its best plan, or sets of plans, to other UGVs with which it communicates. The UGVs may then perform an information handshake to agree on changes to be incorporated. For example, in such an embodiment, plans requiring two UGVs to swap objectives may be implemented if those UGVs are in communication. The niche-based approaches to genetic algorithms are suitable for providing valuable insights into the problem. In a niche-based approach, different niche populations are maintained and optimized on information locally available to that niche. In one embodiment, genetic operators occasionally transmit information between niches, thereby providing the capability for the information in one local search to affect another local search, even if indirectly.

Another property of an effective automated replanning system for UGVs is a capability to develop plans wherein multiple UGVs demonstrate cooperative group behaviors that enable them to solve their missions more effectively. For example, and without limitation, some UGVs may provide reconnaissance support for others. UGVs may cooperate to maintain effective communication networks.

In a well understood domain, use of pre-determined formations is an effective solution to this problem. However, in a poorly-understood and/or highly-dynamic environment, the most effective cooperative behaviors will generally not be known a priori, and have to be discovered automatically by the replanning system and/or method. The ACTB systems and methods described herein provide both types of solutions. One the one hand, a formation advocate may be specialized for a certain known formation and promote it's use. One the other hand, advocates for generic cooperative behaviors, such as scouting and rear support, may promote emergence of novel cooperative responses.

An effective replanning system is typically robust to planning under unknown environments. In general, a UGV may venture into terrain that is poorly understood. Although basic capabilities of the perception and navigation system generally enable a UGV to adjust to most environments, it is desirable for the planning system to recognize and accommodate limitations of those systems. For example, if a UGV is incapable of traversing a terrain at least a portion of which is above a certain grade, then identifying and planning routes around such terrain can be important tactical behaviors. Interaction between scouting behaviors and planning effectiveness is desirable. The ACTB systems and methods described herein facilitate rapid prototyping and study of a variety of scouting behaviors.

In one aspect, it is desirable for a realistic replanning system or method to be capable of having human planners control the planning process. Moreover, it is desirable for such a system or method to be capable of controlling the planning to varying degrees under variable circumstances. While the systems and methods described herein allow the planning process to be completely automated, they may be influenced indirectly by providing new intelligence information. In a typical practical setting, a human operator will be able to take direct control, with automated planning taking a back seat. The human operator may provide a specific plan (or portion of a plan) designed to remain fixed. In an ACTB system or method, the human may adjust the priorities of the planning system to reflect the most recent mission priorities through the selection of critics and their weights. For example, and without limitation, while safety and enemy avoidance may be the overriding factors under normal circumstances in a particular exemplary embodiment, some missions may require extreme risk to be acceptable in order to reach a mission objective.

Experimental Results

To validate the approach employed by the systems and methods described herein, test scenarios have been developed wherein multiple UGVs cooperate to solve complementary and competing mission goals while both minimizing mission completion time and minimizing risk to mission success. One such exemplary scenario incorporates an actual terrain that the U.S. Army uses as a test bed for some of its UGVs. The systems and methods described herein demonstrate that continually-improved plans may be generated quickly, both before and during plan execution, in response to changes in the tactical situation or other environmental stimuli or time-dependent mission demands.

The ACTB systems and methods described herein were tested under four conditions to demonstrate the effectiveness of the tactical critics for multi-objective optimization and examine the search capabilities of ACTB when using tactical advocates in conjunction with traditional genetic operators over using traditional genetic operators alone. The experiment examined the basic tactical route planning capabilities of the ACTB systems and methods described herein. Time scheduling aspects of the problem were minimized by widening the mission time windows. However, path duration was still a prized factor (i.e., do all the missions as soon as possible).

In all conditions, a steady-state genetic algorithm was run using a fixed population size of 50, fitness-proportional selection was used, and offspring competed with all members of the population. Most advocates and genetic operators were applied with the same likelihood of selection (i.e., 1.0). To encourage the system to explore complex paths, insert-waypoint was applied with twice the likelihood of the above (i.e., 2.0), and remove-section with half the likelihood (i.e., 0.5). Critic weights were selected to assign a very high penalty to untraversable portions of the routes and to missed missions, a moderate penalty to exposure to the enemy (i.e., completing the mission is more important than avoiding the enemy), and a small penalty to path duration; the penalty for maximum-duration was weighted twice as strongly as total-duration, to encourage a more balanced distribution of mission goals among UGVs.

Figure 7A:
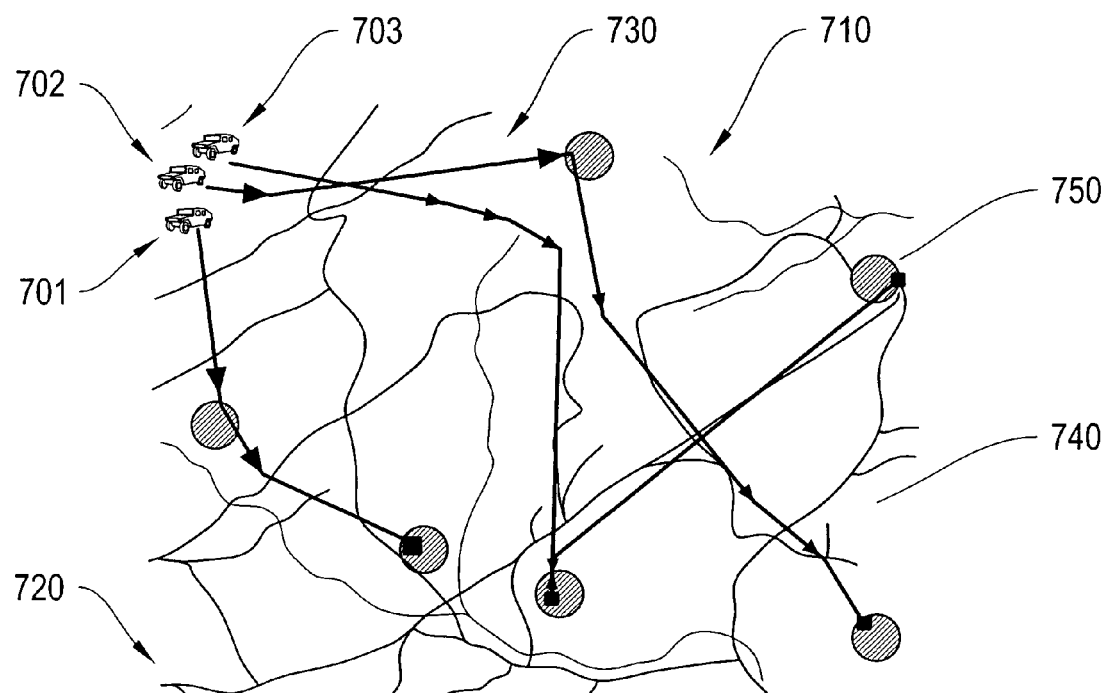
FIG. 7(a) depicts exemplary evolved paths with no known enemies using genetic operators.
Figure 7B:
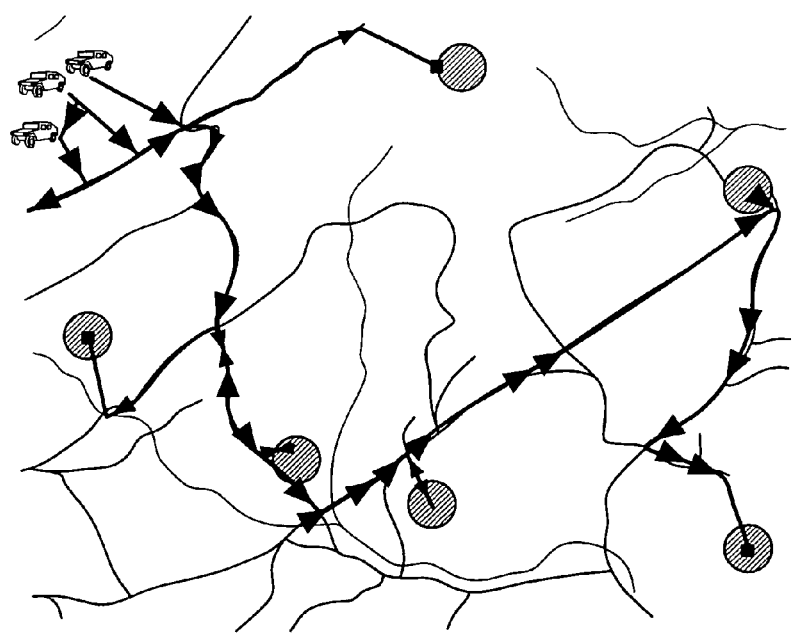
FIG. 7(b) depicts exemplary evolved paths with no known enemies using genetic operators and tactical advocates.
Figure 8A:
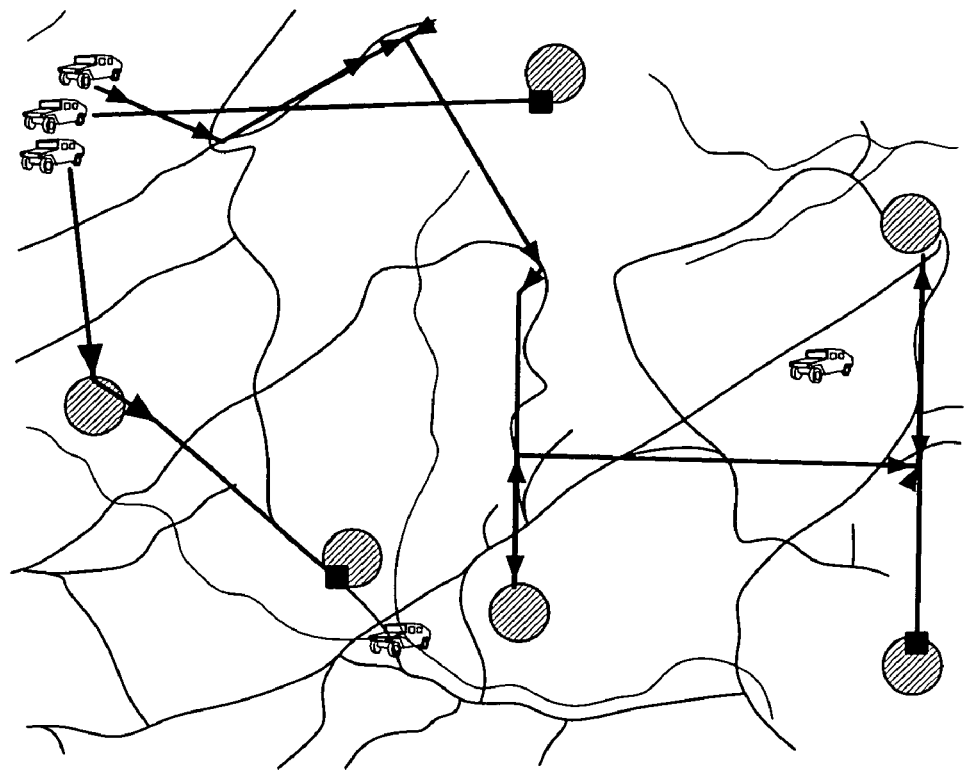
FIG. 8(a) depicts exemplary evolved paths with two known enemies using genetic operators.
Figure 8B:
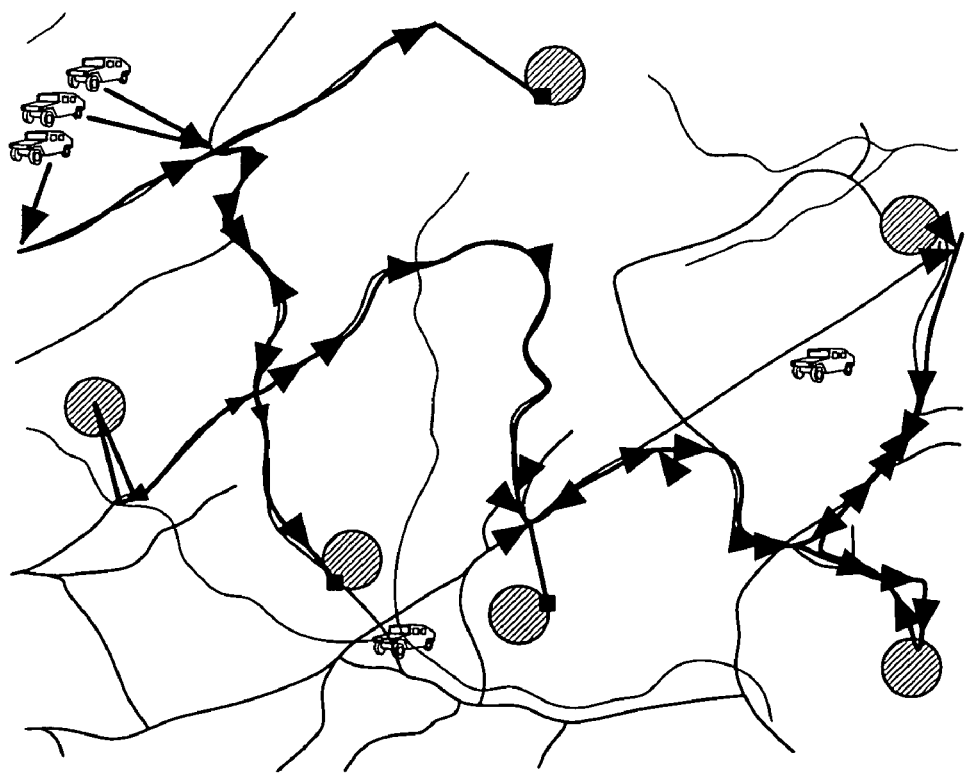
FIG. 8(b) depicts exemplary evolved paths with two known enemies using genetic operators and tactical advocates.

Final plans developed in the four experimental conditions are illustrated in FIGS. 7-8. In the first pair of conditions (FIGS. 7(*a*)-7(*b*)), the systems and methods described herein were employed to examine basic routing in a simple situation with no known enemies. In the second pair of conditions (FIGS. 8(*a*)-8(*b*)), the systems and methods described herein were employed to examine tactical routing in a situation with two known enemies. In the figures, three friendly UGVs (shown as 701-703 in FIG. 7(*a*)) are located in the top left, and each UGV's path is indicated by a different line thickness; for example, the path 730 is associated with the UGV 702. Off-road terrain 740 is shown in white (background), rivers and other waterways are shown in light gray (e.g., 710), roads are shown in dark gray (e.g., 720), and missions points are depicted by the circles (e.g., 750). Intersections of road with water are considered to have bridges. Travel on-road is assumed to be roughly 10 times faster than travel off-road. A similar convention is used in subsequent FIGS. 7(*b*), 8(*a*)-8(*b*), and 10(*a*)-10(*c*), even though these figures are not specifically labeled as such. These figures show that in all conditions, the system was able to evolve plans that were traversable, met all mission goals and distributed mission goals among all three UGVs. In both enemy conditions, the evolved paths avoided the known enemies.

Several prospective planning responses that are potentially useful upon discovery of an enemy near the UGV can be employed. These responses may capture "expert knowledge" used by human planners (and/or by human soldiers in a field). As such, several exemplary heuristics may be defined as follows: (a) Attack: head directly at the enemy and engage in battle; (b) Avoid: change the path, even if slightly, to avoid going too close to the enemy; (c) Hide: change path so that the UGV goes behind some cover that will block it from the enemy's line of sight; (d) Evasive Maneuvers: plan a jagged path to avoid being an easy target for enemy fire; (e) Retreat and Circumvent: retreat as fast as possible and plan a wide circuit around the enemy enabling the UGV to continue toward its mission; and (f) Surveil: change path to minimize risk of detection by the enemy, but still keep the enemy in sight.

It is understood that these sample heuristics are illustrative and should not be construed as limiting in any way. Alternative or additional heuristics may be developed for other situations faced by the UGVs.

Furthermore, in planning a path for a UGV, it may be desirable to capture several different prospective path evaluation constraints/heuristics. As such, listed below are illustrative exemplary constraint/heuristic sets used, in some combination, by the systems and methods described herein:

Constraint 1: Avoid Exposed Areas: generally, it is a good idea to avoid areas that are more visible and have a higher risk of exposure to the enemy. Heuristic 1: For a given location, compute how exposed the location is based on the number of points it is in line-of-sight with, within a radial distance, e.g., 30 meters.

Constraint 2: Avoid Lethal Areas: generally, it is a good idea to avoid traveling too close to an area occupied by an enemy. Heuristic 2(a): If the UGV is within the enemy's firing range, then it is in danger, otherwise not. Heuristic 2(b): Danger rating is proportional to distance from the enemy.

Constraint 3: Engage enemy: generally, it is a good idea to attack and destroy an enemy. Heuristic 3(a): If the UGV is within firing range of the enemy, then it is engaged, otherwise not. Heuristic 3(b): Engagement score is inversely proportional to distance of the UGV from the enemy.

Constraint 4: Duration: generally, it is a good idea to reach destinations as quickly as possible. Heuristic 4(a): distance duration is proportional to the length of the path. Heuristic 4(b): travel time duration is based at least partially on the average speed of the UGV over each terrain type encountered along the path.

Constraint 5: Avoid an Unknown: generally, it is a good idea to travel across terrain that has been recently surveilled. Heuristic 5(a): for a given location, compute how many points within a certain radius (e.g., 20 meters) have been visited previously by the UGV or by another friendly mobile agent. Heuristic 5(b): Time-Decayed Observation: for a given location, compute how many points within a certain radius (e.g., 20 meters) have been visited recently by the UGV or by another friendly mobile agent.

It is understood that these sample heuristics are illustrative and should not be construed as limiting in any way. Alternative or additional heuristics may be developed. For example, and without limitation, these constraint/heuristic sets may be combined into a combined path selection heuristic, as in the following illustrative examples.

Combined Heuristic 1: Get the Job Done and Lower the Risk: High emphasis on (1), (2a), (5). Low emphasis on (4b).

Combined Heuristic 2: Patrol, and Tolerate High Risk: high emphasis on (3a) and (5). Low emphasis on (1) and (4a).

Figure 9:
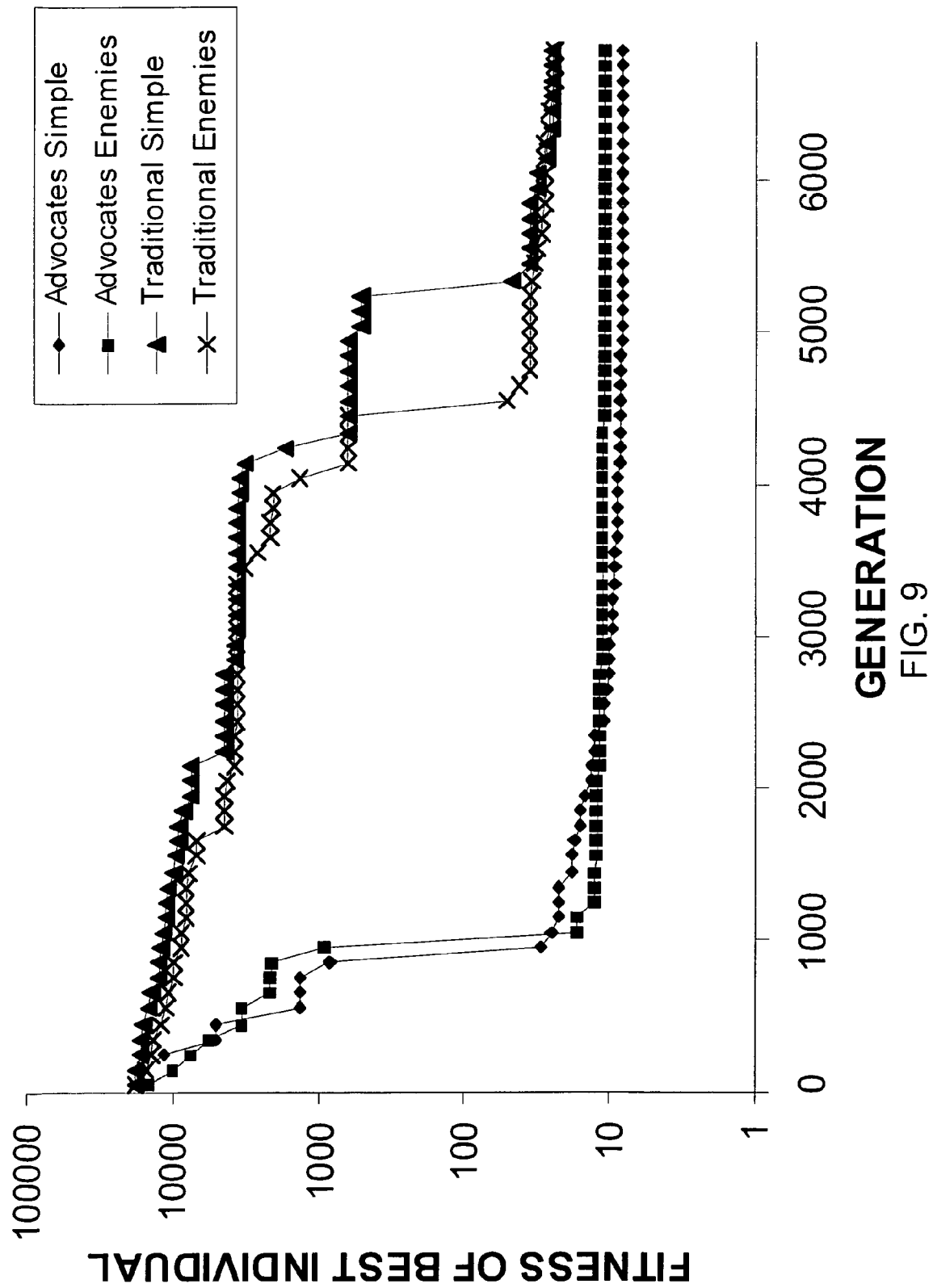
FIG. 9 depicts the fitness of the best individual path by generation for each of four experimental conditions.

FIG. 9 illustrates fitness of the best individual in each generation for each of four experimental conditions. Each condition was run for 30,000 generations to ensure convergence, but all conditions had converged by 7,000 generations. The range of fitness values was very large due to high penalty values assigned by the tactical critics, and the results are graphed on a logarithmic scale to emphasize the changes over evolution. A fitness value under 1,000 indicates no penalty except for duration of path. The ACTB systems and methods described herein clearly demonstrated better plans when using advocates, as illustrated by the better (i.e., lower) fitness values overall and by the rapid achievement of a plan with no major penalties around 1,000 generations as opposed to over 4,000 generations for traditional conditions. The final plan generated in the advocate conditions completed all missions in roughly half the time of the plans generated in the traditional conditions. As illustrated in FIGS. 7($b$) and 8($b$), this improvement is substantially due to improved road following.

Figure 10A:
FIGS. 10(a)-10(c) depict a sequence of three plans illustrating, respectively, an execution plan before, a new plan substantially immediately upon, and a new plan shortly after discovery of a new enemy.
Figure 10B:
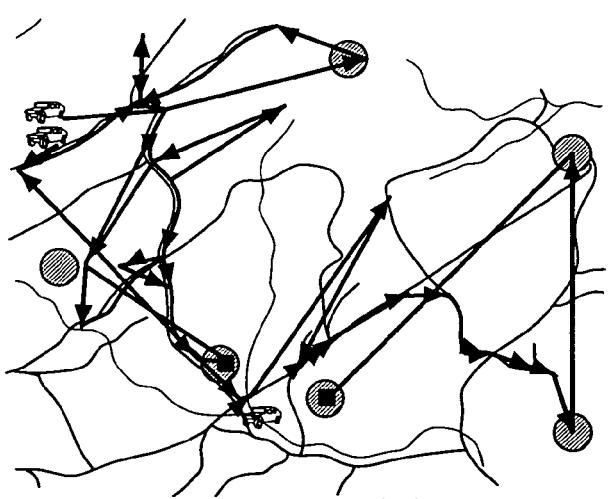
Figure 10C:
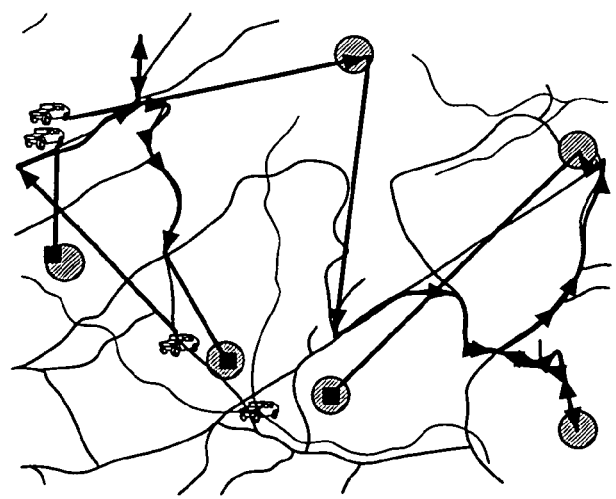

The systems and methods described herein were also tested in a dynamic simulation mode, as described earlier, wherein new enemies may be detected as the UGVs execute an operation plan. The ACTB system has demonstrated the capability for rapid and effective replanning in response to these changes in the tactical situation, as illustrated in FIG. 10. FIG. 10($a$) illustrates a plan under execution immediately before discovery of an enemy. FIG. 10($b$) illustrates the re-planning activity initiated upon the discovery (after a few generations). FIG. 10($c$) illustrates the new plan generated after 300 generations and passed to the two UGVs (shown in the top left of each figure) for execution. Note that after replanning, all UGV paths avoid the area surrounding the enemy.

The systems and methods described herein, in various embodiments, constitute an approach to deliberative planning for coordinating UGVs. This approach is based at least partially on representing the planning problem as a multi-objective optimization problem, which in an exemplary embodiment is solved using a genetic algorithm to dynamically search for a good path or path set. Multiple evaluation components, called tactical critics, enable the evolution of plans satisfying multiple tactical constraints. Domain-specific operators, called tactical advocates, greatly speed the search process yielding rapid plan turnaround. By continually searching for improvements to the plan, the systems and methods described herein ensure that the plan adapts to changes in the tactical situation. The ACTB systems and methods described herein maintain good plans in response to such changes, and are flexible enough to having advocates and critics developed and introduced for additional tactical behaviors, as well as accepting new mechanisms for distributing the evolutionary algorithm to make ACTB amenable to implementation within UGV platforms directly.

The contents of all references, including patents and published patent applications, cited throughout this application are hereby incorporated by reference in entirety.

The systems and methods described herein may be applied in non-military contexts. For example, and without limitation, the systems and methods described herein may be employed to provide operation planning for a fleet of courier delivery vehicles in a metropolitan city. Domain-specific path selection and production heuristics may be used in this context. For example, avoiding high-traffic areas, avoiding safety-compromised intersections or low-throughput streets and highways may be used to at least partially guide the operation planning of the deliveries. Similarly, time window constraints may be used to schedule delivery of packages during desirable or mandatory times intervals.

Many other equivalents to the specific embodiments of the invention and the specific methods and practices associated with the systems and methods described herein exist. Accordingly, the invention is not to be limited to the embodiments, methods, and practices disclosed herein, but is to be understood from the following claims, which are to be interpreted as broadly as allowed under the law.

What is claimed is:

1. A method of determining paths for a fleet of mobile agents to accomplish missions, every path having an ordered set of waypoints to be visited by a corresponding mobile agent, the method comprising:
   a. subject to a path production heuristic, producing candidate path sets using a multi-objective optimization algorithm;
   b. subject to a path selection heuristic, selecting a path set from the candidate path sets, wherein every mobile agent has an associated path belonging to the selected path set;
   c. instructing a first subset of the mobile agents to move according to paths respectively associated with the first subset;
   d. subject to the path production heuristic, modifying a maintained subset of the candidate path sets to produce a new candidate path set using the algorithm;
   e. subject to the path selection heuristic, designating one of the selected path set and the new candidate path set as the selected path set; and
   f. instructing a second subset of the mobile agents to move according to paths belonging to the selected path set, respectively associated with the second subset.

2. The method of claim 1, wherein the modifying includes randomly modifying a characteristic of the maintained subset of the candidate path sets.

3. The method of claim 1, wherein the modifying is independent of the path selection heuristic.

4. The method of claim 1, wherein the modifying includes employing a modifier that advocates a path set modification based at least partially on a tactical criterion.

5. The method of claim 1, wherein the maintained subset satisfies a diversity criterion.

6. The method of claim 1, wherein producing the new candidate path set does not depend on production of another candidate path set.

7. The method of claim 1, wherein the path production heuristic and the path selection heuristic are independent.

8. The method of claim 1, wherein at least one of the path selection heuristic and the path production heuristic is time dependent.

9. The method of claim 1, further including, after step f, repeating steps d-f at least once prior to accomplishing at least one of the missions.

10. The method of claim 9, wherein modifying the maintained subset of the candidate path sets in the repeated step d is independent of modifying the maintained subset of the candidate path sets in a previously-executed step d.

11. The method of claim 1, wherein the selected path set includes a local movement instruction for at least one of the mobile agents.

12. The method of claim 1, including reordering, at least once prior to accomplishing at least one of the missions, a remaining set of waypoints to be visited by an associated mobile agent.

13. The method of claim 12, wherein the reordering is independent of a path previously selected for the associated mobile agent.

14. The method of claim 12, wherein the reordering is at least partially based on an alteration of at least one of the path selection heuristic and the path production heuristic.

15. The method of claim 12, wherein the reordering is at least partially based on an alteration of an environmental characteristic.

16. The method of claim 1, including removing, prior to accomplishing the mission, from the selected path set a waypoint in a remaining set of waypoints to be visited by an associated mobile agent.

17. The method of claim 16, wherein the removing is independent of a path previously selected for the associated mobile agent.

18. The method of claim 16, wherein the removing is at least partially based on an environmental characteristic.

19. The method of claim 16, wherein the removing is at least partially based on an alteration of at least one of the path selection heuristic and the path production heuristic.

20. The method of claim 1, including adding, prior to accomplishing at least one of the missions, to the selected path set a waypoint in a remaining set of waypoints to be visited by an associated mobile agent.

21. The method of claim 20, wherein the adding is independent of a path previously selected for the associated mobile agent.

22. The method of claim 20, wherein the adding is at least partially based on an environmental characteristic.

23. The method of claim 20, wherein the adding is at least partially based on an alteration of at least one of the path selection heuristic and the path production heuristic.

24. The method of claim 1, wherein producing the new candidate path set includes exchanging a waypoint associated with a first mobile agent with a waypoint associated with a second mobile agent.

25. The method of claim 1, wherein the selected path set includes an instruction governing movement of a mobile agent between a pair of waypoints belonging to a path associated with the mobile agent.

26. The method of claim 1, wherein the multi-objective optimization algorithm includes an evolutionary algorithm.

27. The method of claim 26, wherein the evolutionary algorithm includes a genetic algorithm.

28. The method of claim 1, wherein at least one of the path selection heuristic and the path production heuristic includes a subset of a mission criterion, a tactical criterion, a spatial criterion, a temporal criterion, and a logistical criterion.

29. The method of claim 28, including assigning a weight to at least one of the mission criterion, the tactical criterion, the spatial criterion, and the temporal criterion.

30. The method of claim 29, wherein the weight is time dependent.

31. The method of claim 28, wherein the temporal criterion includes a time window of arrival associated with a waypoint belonging to the selected path set.

32. The method of claim 1, including altering at least one of the path selection heuristic and the path production heuristic at least once prior to accomplishing at least one of the missions.

33. The method of claim 32, including repeating steps d-f based at least partially on the at least one altered heuristic.

34. The method of claim 1, wherein an environmental characteristic is altered prior to accomplishing at least one of the missions.

35. The method of claim 34, including repeating steps d-f based at least partially on the altered environmental characteristic.

36. The method of claim 1, wherein the first and the second subsets are substantially identical.

37. A method of determining movement of mobile agents to accomplish missions, subject to constraints, the method comprising:
 a. producing candidate path sets using a multi-objective optimization algorithm;
 b. from the candidate path sets, selecting a path set satisfying the constraints, wherein every mobile agent has an associated path belonging to the selected path set;
 c. instructing a first subset of the mobile agents to move according to paths respectively associated with the first subset;
 d. continually producing new candidate path sets using the algorithm;
 e. based at least partially on the constraint, designating one of the selected path set and the new candidate paths set as the selected path set; and
 f. instructing a second subset of the mobile agents to move according to paths respectively associated with the second subset.

* * * * *